Jan. 21, 1936.  H. HOFFMAN  2,028,453
ILLUMINATING APPARATUS
Filed Oct. 25, 1930  2 Sheets-Sheet 1
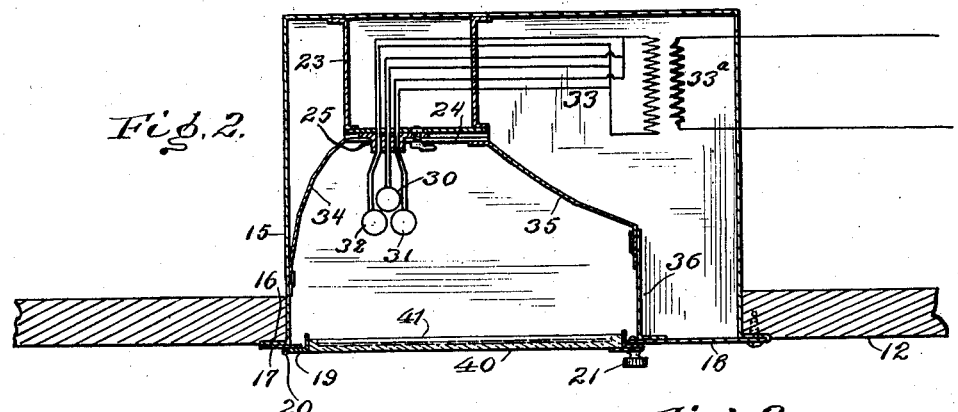
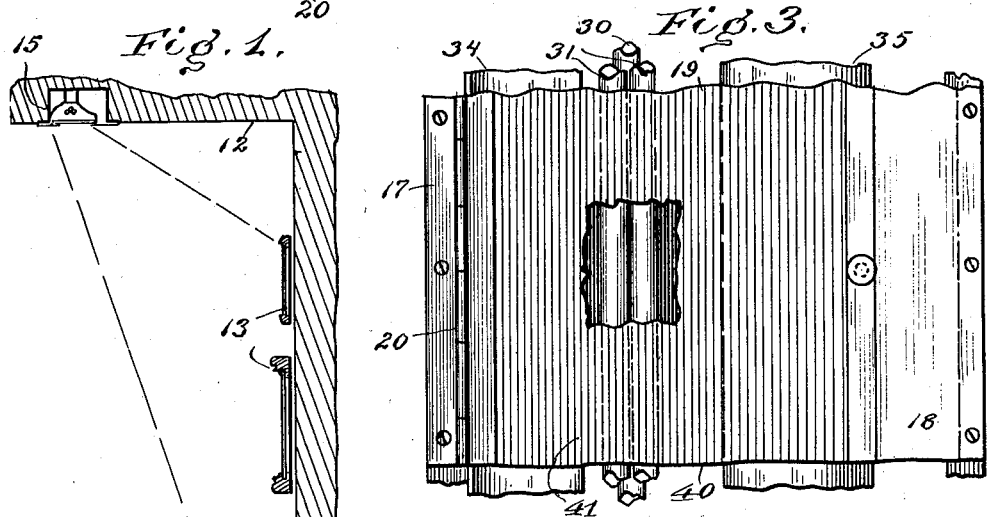
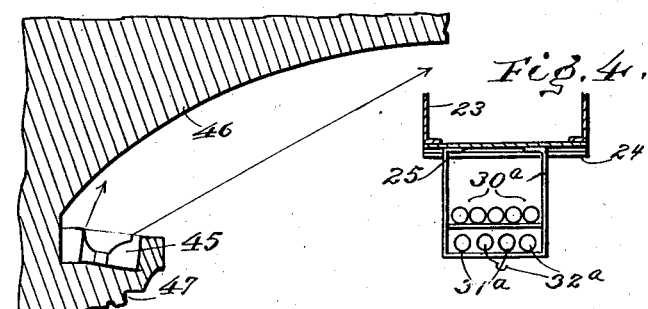
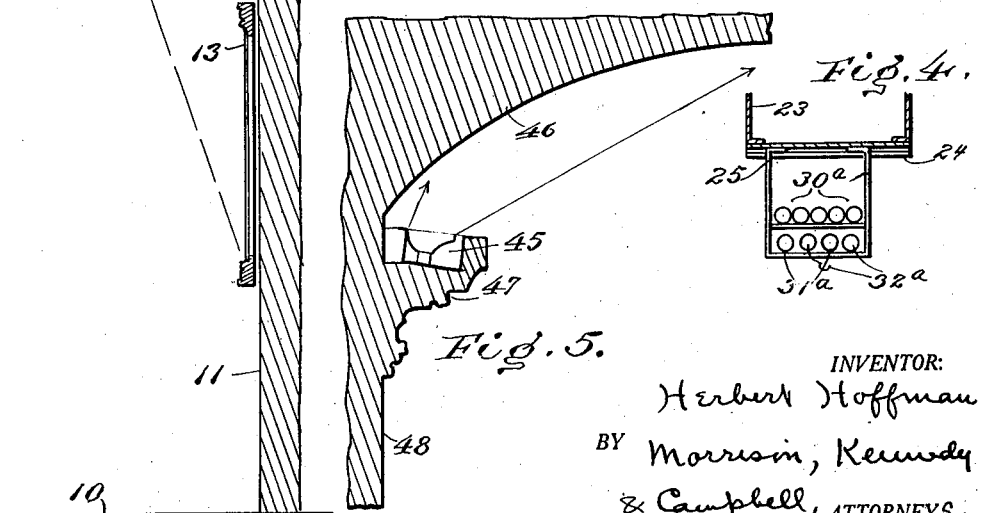
INVENTOR:
Herbert Hoffman
BY Morrison, Kennedy
& Campbell, ATTORNEYS.

Jan. 21, 1936. H. HOFFMAN 2,028,453
ILLUMINATING APPARATUS
Filed Oct. 25, 1930 2 Sheets-Sheet 2

INVENTOR:
Herbert Hoffman
BY Morrison, Kennedy
& Campbell, ATTORNEYS.

Patented Jan. 21, 1936

2,028,453

UNITED STATES PATENT OFFICE 2,028,453

ILLUMINATING APPARATUS

Herbert Hoffman, Jackson Heights, N. Y.

Application October 25, 1930, Serial No. 491,170

21 Claims. (Cl. 240—78)

This invention is a novel illuminating apparatus, having extensive utility particularly where a substantial area, surface, or field is to be illuminated by oblique projection of light rays from an offset position. One instance of the use of the invention is in illuminating objects or pictures mounted upon a wall of a room, the source of illumination being located at or within the ceiling line. Another instance of utility is in illuminating a collection of objects in a show window or exhibition casing. Other uses include the lighting of a ceiling from the wall of a room; for illuminating certain signs in oblique direction, and the like.

A general object of the invention is to improve the illumination of the receiving field area, or surface, whatever may be its nature, and more especially by affording a substantial uniformity of distribution of light over the field, for example by asymmetric or graduated projection from the offset source to give uniform intensity over the height of the wall of a room, picture gallery, or the like. A further object is to give such result extended longitudinally over an indefinite length of field, by means of what may be termed a sheet of light as distinguished from light emanating from disconnected sources and concentrated in small areas or cones.

A further object of the invention relates to the improvement in the source of illumination, namely, in a manner to avoid spottiness of illumination, or the concentration of light in local areas; also to permit the color value of the illumination to be predetermined by a mixing or blending of a plurality of sources in a manner as will be described.

Other and further objects and advantages of the invention will be explained in the hereinafter following description of one or more illustrative embodiments of the invention, or will be understood to those conversant with the subject. To the attainment of such objects and advantages the present invention consists in the novel illuminating apparatus and the novel features of combination, arrangement and construction herein illustrated and described.

In the accompanying drawings, Fig. 1 is a vertical sectional view of a representative application of the invention, namely to the wall of a room or gallery, with the illuminating apparatus set flush into the ceiling.

Fig. 2 is a vertical transverse sectional view similar to Fig. 1 but of the illuminating apparatus only, and on a larger scale.

Fig. 3 is a fragmentary bottom plan view of a substantial length of apparatus shown in Fig. 2.

Fig. 4 is a vertical transverse sectional view of a modified form of illuminating means, including a greater number of luminous elements than in Figs. 1–3.

Fig. 5 in vertical section, shows a modified use of the invention, namely, for the illumination of a vaulted or other ceiling from a cornice.

Figure 6:
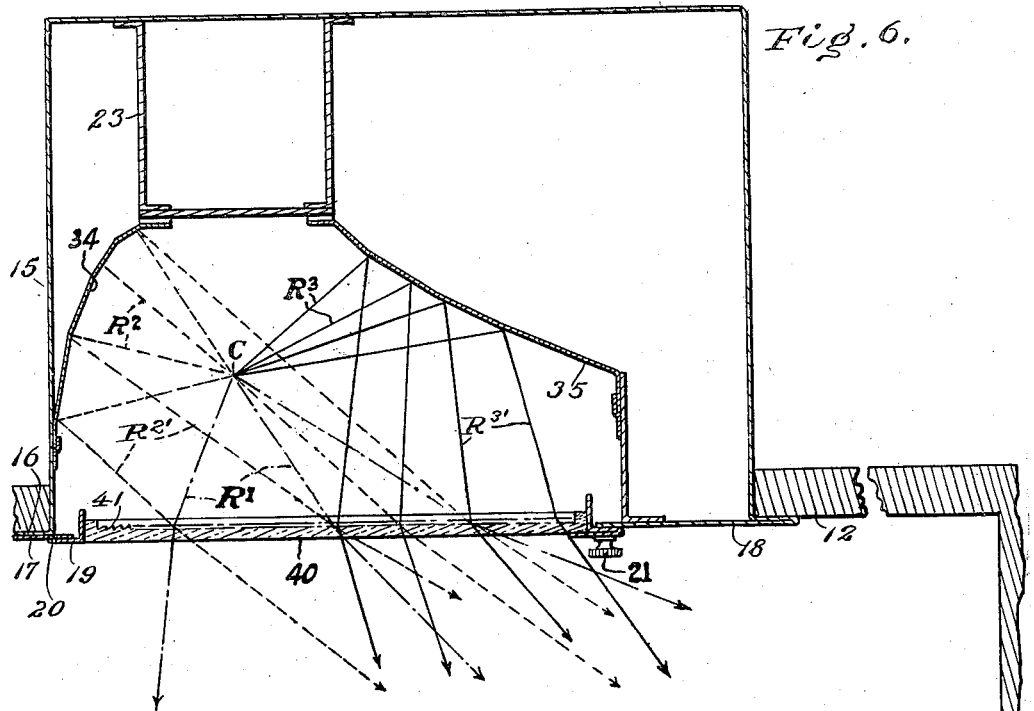

Fig. 6 is a vertical sectional view similar to Figs. 1 and 2, but on a larger scale, with some parts omitted, and showing diagrammatically the light rays as projected by the reflecting means and prism plate, on the assumption of a single luminous element.

Figure 6A:
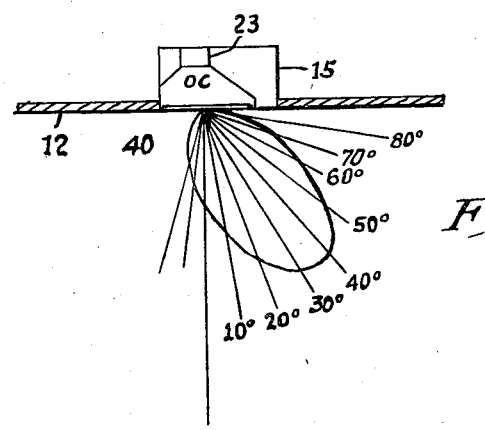

Figure 6a is a diagrammatical view illustrating the distribution of light of the system in the plane of Figures 2 and 6.

Figure 7:
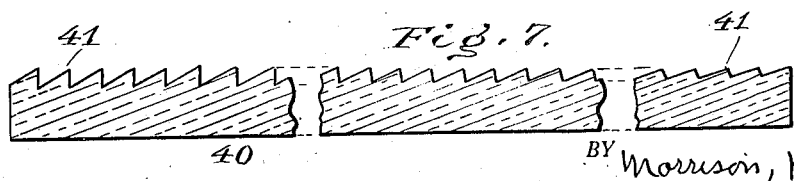

Fig. 7 is a detail transverse sectional view of the prism plate, partly broken away.

In Fig. 1 is shown the floor 10 of a room or gallery from which extends upwardly a wall or field 11, surmounted by a ceiling 12, the wall representing any field of exhibition, carrying for example a number of articles or pictures 13 suitably mounted thereon and to be illuminated with substantial uniformity by light rays obliquely projected from the ceiling.

Located at the ceiling and spaced from the wall is shown a box or housing 15. This housing may be arranged in various ways, for example inset substantially flush with the ceiling, and it may be secured thereto through the medium of flanges 16 extending along the marginal edges of the walls of the box. It will be understood from Figs. 1–3 that the illuminating box or housing 15 is offset outwardly from the plane of the wall 11, but extends longitudinally parallel with the wall for a considerable distance, perhaps for substantially the full length of the room or exhibit, giving a substantially continuous longitudinal illumination, as distinguished from a series of separated illuminations.

The housing 15 so mounted may be underlaid by a flange 17 formed at the left and a wall 18 at the right which, with suitable flanges or walls at the ends, form a receiving frame around the recess occupied by the box 15. Removably mounted in the recess or receiving frame is shown a carrier frame 19 for a prism plate to be described. The carrier may be swingably mounted by a hinge 20 at the left and held in place by a latch 21 at the right, so as to give ready access for assembling, adjusting or replacing the parts.

Within the housing 15 are shown depending walls 23 arranged for giving support to spaced transverse guides 24 on which flanged carriages 25 may slide leftward and rightward for the adjustment of the position of luminous elements which are supported by it.

According to the present invention, the luminous elements form a substantially continuous source of illumination extending longitudinally for substantially the length of the wall or field to be illuminated. The preferred source of illumination consists of a single elongated luminous tube, or preferably a coordinated group of luminous tubes 30, 31 and 32. These, for example, may be of the character of the well known neon tubes, consisting of elongated glass tubes, bulbs, or lamps, containing a gaseous element adapted to be rendered luminous by suitable electric currents. Taking, for instance, the example shown in Figs. 1, 2 and 3, there are indicated three longitudinal luminous tubes, namely, one tube 30 emitting red light and one tube 31 emitting blue light and one tube 32 emitting green light. While this combination is intended roughly to approximate daylight, it is to be understood that the invention contemplates other and different combinations, the point being that a plurality of luminous elements emitting rays of different colors cooperate in combining and blending their rays into a desired composite light, which may approximate white or any resultant color. A single tube, or several of a single color may be used when the color emitted is that desired for the purpose at hand.

Thus the luminous tubes of the group may vary in number and arrangement, according to the effect desired. When a white effect, or a daylight effect is desired, an arrangement such as shown in Fig. 4 may be preferable wherein are comprised five red light tubes 30ª, two blue light tubes 31ª, and two green light tubes 32ª. These give a fair approximation to the desired light. In any case, the source of energy for producing the luminous effect may be supplied by conducting wires such as 33 connected as shown diagrammatically in Fig. 2. The alternating currents may be induced by the use of a suitable transformer 33ª connected in the circuit as shown in Fig. 2, when high voltage is desired, which may be omitted with tubes operating upon low voltage, or upon direct current.

The group of luminous tubes may be assembled in predetermined relation and mounted suspended beneath the sliding carriage or carriages 25, which may be placed near the end of the apparatus and at spaced points along its length, to give support to the tubes, while permitting the tubes to be adjusted inwardly or outwardly, that is, toward right or left, to focus or adjust the light rays properly upon the wall, surface or objects to be illuminated.

In combination with the described or equivalent continuous source of longitudinal illumination, this invention further comprises one or more mirrors or reflectors, and a longitudinal prism plate, said reflectors and plate surrounding or enclosing the luminous tubes within the box or housing 15. The prism plate is located adjacent to the light source, and between it, and the wall or field to be illuminated, so that the light must pass through it, to assist in the distribution and blending of the light transmitted to the wall. The mirrors or reflectors are located one outwardly or to the left and the other inwardly or to the right of the luminous tubes, and they may be formed of a single piece of suitable material or of any desired number of separate sections.

Thus, in Figs. 1, 2 and 3 a left or outer mirror 34 is shown of concave and preferably asymmetric form adapted to receive the light from the source and to reflect it in such a way as to distribute it as desired over the surface of the prism plate. By asymmetric is meant an arrangement not symmetric or concentric with the center of luminosity. The exact contour of the mirror 34 may be varied to suit different installations, but it may be generally curved or segmental in cross section, to give the illustrated sort of reflection, and extending longitudinally the entire length of the apparatus.

At the right or inner side, or between the light source and the wall, a mirror 35 of convex form is shown, it being also asymmetric, and substantially curved or segmental, and designed to receive the light from the entire group of tubes and reflect it with suitable distribution over the prism plate.

The mirror 34 may be supported between the left wall 23 and the left or outer side wall of the box 15, while the mirror 35 may be supported by the right wall 23 and at its lower end by a partition or support 36. The outer end of mirror 34 extends outwardly beyond the outer end of mirror 35. An additional mirror might be carried by the carriage 25 directly above the tubes, or the mirrors 34 and 35 joined between, for reflection from above.

The prism plate is designated generally by the reference character 40, and is mounted for support in the swinging carrier or frame 19, substantially flush with the ceiling 12. This prism plate is formed of glass or other suitable material, either transparent or somewhat translucent, and may be made either in a single continuous piece extending the full length of the frame 19 or in a plurality of sections mounted in endwise alinement. One surface of the prism plate is provided with a multiplicity of longitudinally extending prismatic elements or ridges 41 for giving the desired optical refractive power to cooperate with the light source and with the reflectors 34 and 35 to effect the offset or oblique projection of the light rays with practically uniform intensity of illumination on the wall 11. Preferably the prismatic ridges are of graduated optical power so as more correctly to spread the received light rays through the desired angle of projection. Thus, for example, in the illustrated embodiment the ridges 41 at the left side of the prism plate are of greater depth and angularity than those at the right side, and the intermediate ridges may vary with a substantially uniform gradation between the two extremes.

Before referring further to the operation and principles of the invention, reference will be made to the modification of Fig. 5, which is a substantial inversion in that the projecting apparatus 45 while similar to that in the other figures, is inverted and reversed so as to project upwardly and inwardly to a ceiling 46 which may be vaulted or curved to a cornice 47 near the top of a wall 48 of the room. This arrangement gives an indirect illumination which is not concentrated adjacent to the source, or above the cornice, but exhibits substantially uniform intensity outwardly, for example, to the center of the room, owing to certain zones having greater candlepower than others.

The operation, with respect to an assumed single source or line of light, is indicated in the diagram of Fig. 6. In this figure, the center of illumination is shown at C, this representing the center either of a single luminous bulb or of a group of bulbs as the case may be. Electric current is supplied to the device to excite the bulb or bulbs and thus to produce the desired light, and through the medium of the carriages 25 in the guides 24, the light source is adjusted to the proper position or focus to cooperate with the prism plate and reflectors.

One part of the light passes from the lighting center C directly to and through the prism plate, the paths indicated by the dot-and-dash lines R'. Due to the refractive properties of the prism plate, the light rays are deflected laterally in varying degrees, as indicated, depending upon the points at which they strike the prism plate.

Another portion of the light rays passes from the lighting means to the surface of the reflector 34, whence the rays are reflected back to and through the prism plate as indicated by the dotted lines R².

A third portion of the light rays passes from the lighting means to the surface of the reflector 35, whence the rays are reflected back to and through the prism plate as indicated by the full lines R³.

The reflected light rays R²' and R³' will be refracted or deflected as indicated in their passage through the prism plate. There are still other kinds of projection, namely from the source to each reflector and thence to the other reflector and through the prism plate; but these are of minor consequence and omitted from the diagram.

The light distribution curve will be as shown in Figure 6a. This curve indicates the relative candlepower at the various angles. In actual installation the equipment is so arranged that the maximum candlepower is directed to the lower portion of the wall so as to result in a substantially uniform distribution of light under the laws of inverse squares.

The total arrangement is such that the light rays are reflected, transmitted, refracted, blended, and redistributed to give the desired composite light with substantially uniform intensity over the area to be illuminated. It will be understood that the single light source or center C diagrammatically shown in Fig. 6 represents a group of varicolored longitudinal light sources or tubes as shown in the other figures. The rays from the several tubes will assume paths each slightly different from the others and from the paths of the diagram, with an overlapping and mixing action too complicated to show on the diagram. The combined actions of the reflectors and prism plate on this network of rays give a most thorough mixing and blending of the several components and colors, which blending is completed as the composite rays emerge from the prism plate and travel toward the subject to be illuminated.

The apparatus as a whole therefore both blends the several colored lights into a uniform or white composite light, and projects and spreads this over the wall or subject with a substantially uniform distribution.

The resulting illumination is substantially free from bright spots and shadows; there is no glare; there are no color fringes, but the projection gives a soft, even, well-blended composite illumination of the desired color, well distributed and balanced over the entire subject, field or wall.

Uses of the present invention, other than those enumerated, include the following. Illumination of art exhibits, bill boards, indicator boards, blackboards, foot lights for stages, exhibits etc., flood lighting of walls or floors, illumination of game courts, general illumination of surgical or other operating room or area, by distribution toward the center from plural peripheral points. For interiors a set of four or other plural number of embodiments may be combined, assembled as a multiple unit, centrally located, and directed outwardly and downwardly in radiating directions, for general distribution of light; in which case each luminous tube may be extended into two or more sections of the unit, with bends between; and this embodiment may be wholly inverted for general indirect lighting, by illumination of a ceiling. In any of these uses the form and relation of the light source, reflectors and prism plate may be varied to suit the conditions.

The prism plate 40 may be varied in structure, within the described principles. The gradation of ridges 41 may be carried from one side to the middle and then reversed to the other side, for special purposes, for example for longitudinal illumination of a corridor.

There has thus been described an illuminating apparatus, embodying the principles and attaining the objects of the present invention. Since various matters of combination, arrangement and construction may be modified without departing from the principles of the invention it is not intended to limit the invention to such matters except so far as set forth in the appended claims.

What is claimed is:

1. An apparatus for illuminating a field or surface by oblique projection from an offset position, comprising, the combination of a plurality of longitudinally elongated continuous illuminable tubes providing a light source substantially parallel to the field to be illuminated, at the offset position, said tubes being of a length corresponding substantially to that of said field, a longitudinally elongated prism plate having the prisms thereof disposed throughout one face thereof, arranged in parallelism and extending longitudinally of such face, said plate positioned between said tubes and the field, one or more non-flat longitudinally elongated asymmetric reflectors behind and arranged to distribute reflected light to the prism plate, said elements so combined and arranged as to distribute the obliquely projected light to afford substantially uniform illumination of the field in both longitudinal and transverse directions, and a slidable carriage for suspending and bodily adjusting simultaneously said tubes.

2. An apparatus for substantial uniform illumination of a field or surface in both longitudinal and transverse directions by oblique projection from an offset position comprising the combination of a continuous, longitudinally elongated electrically energized luminous means disposed parallel to the field to be illuminated, at the offset position, said means being of a length corresponding substantially to that of said field, a longitudinal elongated prism plate having its prisms arranged in parallelism and disposed longitudinally throughout one face thereof, said plate positioned between said luminous means and said field, the prisms being graduated, and longitudinally elongated asymmetric reflecting means comprising oppositely curved reflecting surfaces having high reflecting characteristics, said surfaces positioned behind and arranged to distribute reflected light to said plate.

3. An apparatus for substantial uniform illumination of a field or surface in both longitudinal and transverse directions by oblique projection from an offset position comprising, the combination of a continuous, longitudinally elongated electrically energized luminous means disposed parallel to the field to be illuminated, at the offset position, said luminous means being of a length corresponding substantially to that of said field, a longitudinal elongated prism plate having its prisms arranged in parallelism and disposed longitudinally throughout one face thereof, said plate positioned between the luminous means and the field, the prisms being graduated, longitudinally elongated asymmetric reflecting means behind and arranged to distribute reflected light to said plate, and slidable means for suspending and bodily adjusting said luminous means relative to said plate.

4. An apparatus for illuminating a field or surface by oblique projection from an offset position, comprising the combination of a longitudinally elongated light source substantially parallel to the field to be illuminated, at the offset position, said light source being of a length corresponding substantially to that of said field, a longitudinally elongated prism plate having its prisms arranged in parallelism and disposed longitudinally thereof, said light source conforming in length substantially to the length of the prisms, said plate positioned between said source and field, non-flat longitudinally elongated asymmetric reflecting means behind and arranged to distribute reflected light to said plate, and a supporting structure for said source and means adapted to be inset in a wall at right angles to the field and including means for adjusting said source laterally with respect to the prisms.

5. An apparatus for illuminating a field or surface by oblique projection from an offset position, comprising, the combination of a longitudinally elongated light source formed of a plurality of continuous longitudinally elongated electrically energized luminous tubes providing a light source emitting different colors, said source being substantially parallel to the field to be illuminated, at the offset position, said light source being of a length corresponding substantially to that of said field, a longitudinally elongated prism plate having its prisms disposed in parallelism and longitudinally of the plate, said plate positioned between the light source and field and blending the colors emitted from the tube to a resulting color, a longitudinally elongated convex reflector asymmetrically curved and a longitudinally elongated concave asymmetrically curved reflector, said reflectors arranged behind the prism plate and arranged to distribute reflected light to the prism plate.

6. An apparatus for illuminating a field or surface by oblique projection from an offset position, comprising, the combination of a longitudinally elongated light source formed of a plurality of continuous longitudinally elongated electrically energized luminous tubes providing a light source emitting different colors, said source being substantially parallel to the field to be illuminated, at the offset position, said light source being of a length corresponding substantially to that of said field, a longitudinally elongated prism plate having its prisms disposed in parallelism and longitudinally of the plate, said plate positioned between the light source and field and blending the colors emitted from the tube to a resulting color, a longitudinally elongated convex reflector asymmetrically curved and a longitudinally elongated concave asymmetrically curved reflector, said reflectors arranged behind the prism plate and arranged to distribute reflected light to the prism plate, and each of said tubes being of a length substantially the same as the length of a prism.

7. An illuminating device comprising the combination of an open front housing, a frame hinged to and normally latched to the housing at the open front of the latter, a longitudinal elongated light source within the housing and of a length corresponding substantially to that of the object to be illuminated, a pair of oppositely curved longitudinal elongated spaced reflectors within the housing on opposite sides of the light source, a prism plate supported by said frame and having longitudinal parallel prisms, and slidable means within the housing for suspending the light source and for adjusting the latter transversely with respect to the prisms.

8. An apparatus for illuminating a field comprising, the combination of an open front housing for insetting in a support, said housing arranged at right angles to the field, a frame hinged to and normally latched to the housing at the open front thereof, a longitudinally elongated light source within the housing, said source being substantially parallel to and corresponding substantially in length to that of the field, in offset position, a pair of oppositely curved longitudinally elongated opposed reflectors within the housing on opposite sides of and corresponding substantially in length to that of the light source, and a prism plate supported by said frame and having longitudinally elongated graduated parallel prisms corresponding substantially in length to that of the light source.

9. An apparatus for illuminating a field comprising, the combination of an open front housing adapted to be inset in a support, said housing being arranged at right angles to the field to be illuminated, a frame hinged to and normally latched to the housing at the open front thereof, a longitudinally elongated light source within the housing, said source being substantially parallel to the field, in offset position, a pair of oppositely curved longitudinally elongated reflectors within the housing, disposed on opposite sides and corresponding substantially in length to that of the light source, a carriage slidably supported in the housing for suspending and shifting the light source in the latter, and a prism plate supported by said frame and having a series of longitudinally elongated graduated parallel prisms corresponding substantially in length to that of the light source.

10. An apparatus for illuminating a field or surface by oblique projection from an offset position, comprising the combination of a longitudinal elongated light source emitting different colors and being substantially parallel to the field to be illuminated, at the offset position, the light source being of a length corresponding substantially to that of the field, a longitudinally elongated prism plate having its prisms disposed in parallelism and longitudinally of the plate, said plate positioned between the light source and field and blending the colors emitted from the light source to a resulting color, a longitudinally elongated convex reflector arranged behind said plate, at one side of and of a length substantially the same as that of the light source, and a longitudinally elongated concave reflector arranged behind said plate, at the other side of and of a length substantially the same as that of the light source, said reflectors distributing reflected light to the prism plate.

11. An illuminating device comprising the combination of an open front housing, a frame hinged to and normally latched to the open front of the latter, a longitudinally elongated light source within the housing and corresponding in length to that of the object to be illuminated, a pair of curved longitudinally elongated spaced reflectors within the housing on opposite sides of the light source, a prism plate supported by said frame and having longitudinally elongated parallel prisms, and slidable means within the housing for suspending and bodily adjusting the light source.

12. An apparatus for illuminating a field, comprising the combination of a longitudinally elongated light source disposed substantially parallel to the field to be illuminated, at the offset position, a plate having prisms disposed in the direction of the length of the light source, the length of said prisms conforming substantially to the length of said source, said plate being positioned between the field and said source, a reflector having a concave reflecting surface opposing a portion of one face of said plate, and a reflector having a convex reflecting surface arranged immediately opposite and spaced from said concave reflecting surface opposing another portion of said face of said plate, the length of said surfaces conforming substantially to the length of said prisms.

13. An apparatus for illuminating a field comprising the combination of a longitudinally elongated light source formed of a plurality of continuous longitudinally elongated electrically energized luminous tubes providing a light source emitting different colors, said light source being disposed permanently substantially parallel to the field to be illuminated, at the offset position, a plate having prisms disposed in the direction of the length of the light source, the length of said prisms conforming substantially to the length of said source, said plate being positioned between the field and said source, a reflector having a concave reflecting surface opposing a portion of one face of said plate, and a reflector having a convex reflecting surface arranged immediately opposite and spaced from said concave reflecting surface opposing another portion of said face of said plate, the length of said surfaces conforming substantially to the length of said prisms.

14. An apparatus for illuminating a field, comprising the combination of a longitudinally elongated light source emitting different colors, said light source being disposed permanently substantially parallel to the field to be illuminated, at the offset position, a plate having prisms disposed in the direction of the length of the light source, the length of said prisms conforming substantially to the length of said source, said plate being positioned between the field and said source, a reflector having a concave reflecting surface opposing a portion of one face of said plate, and a reflector having a convex reflecting surface arranged immediately opposite and spaced from said concave reflecting surface opposing another portion of said face of said plate, the length of said surfaces conforming substantially to the length of said prisms.

15. An apparatus for illuminating a field, comprising the combination of a longitudinally elongated light source disposed substantially parallel to the field to be illuminated, at the offset position, a plate having prisms disposed in the direction of the length of the light source, the length of said prisms conforming substantially to the length of said source, said plate being positioned between the field and said source, a reflector having a concave reflecting surface opposing a portion of one face of said plate, a reflector having a convex reflecting surface arranged immediately opposite and spaced from said concave reflecting surface opposing another portion of said face of said plate, the length of said surfaces conforming substantially to the length of said prisms, and said light source being positioned relatively far from the lengthwise median of said plate.

16. An apparatus for illuminating a field or surface by oblique projection from an offset position comprising a longitudinally elongated light source substantially parallel to the field to be illuminated, at the offset position, a longitudinally elongated prism plate having its prisms parallel to each other and disposed longitudinally thereof, said plate positioned between such light source and field, and reflecting means arranged on opposite sides of said light source and having provisions for directing the light rays received thereon from one side of said source at inclinations toward said plate and for directing the light rays received thereon from the other side of the light source at inclinations toward said plate and at less angles of inclination than that of the first mentioned directed rays.

17. An illuminating device for a field or object comprising the combination of a housing having an opening at its front, an inwardly extending support within and of less depth than the housing, said support secured to the inner face of the front of the housing adjacent an edge of said opening, a frame, means for connecting the frame to the housing in position to extend completely across said opening, a longitudinally elongated light source suspended within said housing at a point located between said support and a wall of the housing, a suspension means for said light source, a pair of longitudinally elongated spaced reflectors within the housing, one of said reflectors having its outer and inner ends anchored respectively to a wall of the housing and said suspension means and the other having its outer and inner ends anchored respectively to said support and suspension means, and a prism plate supported by said frame and having its prisms arranged in parallelism and longitudinally elongated.

18. An illuminating device for a field or object comprising the combination of a housing having an opening at its front, an inwardly extending support within and of less depth than the housing, said support secured to the inner face of the front of the housing adjacent an edge of said opening, a frame, means for connecting the frame to the housing in position to extend completely across said opening, a longitudinally elongated light source suspended within said housing at a point located between said support and a wall of the housing, a suspension means for said light source, a pair of longitudinally elongated spaced reflectors within the housing, one of said reflectors having its outer and inner ends anchored respectively to a wall of the housing and said suspension means and the other having its outer and inner ends anchored respectively to said support and suspension means, a prism plate supported by said frame and having its prisms arranged in parallelism and longitudinally elongated, and the said suspension means having provisions for adjusting the light source relative to said reflectors.

19. An illuminating device for a field or object comprising the combination of a housing having an opening at its front, an inwardly extending support within and of less depth than the housing, said support secured to the inner face of the front of the housing adjacent an edge of said opening, a frame, means for connecting the frame to the housing in position to extend completely across said opening, a longitudinally elongated light source suspended within said housing at a point located between said support and a wall of the housing, a suspension means for said light source, a pair of longitudinally elongated spaced reflectors within the housing, one of said reflectors having its outer and inner ends anchored respectively to a wall of the housing and said suspension means and the other having its outer and inner ends anchored respectively to said support and suspension means, a prism plate supported by said frame and having its prisms arranged in parallelism and longitudinally elongated, and one of said reflectors being extended outwardly beyond the outer end of the other reflector.

20. An apparatus for illuminating a field or surface by oblique projection from an offset position comprising a longitudinally elongated light source substantially parallel to the field to be illuminated, at the offset position, a longitudinally elongated prism plate having its prisms parallel to each other and disposed longitudinally thereof, said plate positioned between said light source and field, and reflecting means arranged relatively to said light source and having provisions for directing the light rays thereon from one side of said source at inclinations towards said plate and for directing the light rays received therefrom from the other side of the light source at inclinations toward said plate and at less angles of inclination than that of the first mentioned directed rays.

21. The invention, as set forth in claim 20, having the light source continuous and of a length substantially the same as the length of the field to be illuminated.

HERBERT HOFFMAN.